United States Patent [19]

Green et al.

[11] Patent Number: 5,203,526
[45] Date of Patent: Apr. 20, 1993

[54] HOSE GUIDE APPARATUS

[76] Inventors: Robert E. Green, 5401 Rodgers Ave., Harrisburg, Pa. 17112; Ronald C. Green, P.O. Box 232, Pine Grove, Pa. 17963

[21] Appl. No.: 808,474

[22] Filed: Dec. 16, 1991

[51] Int. Cl.⁵ .............................................. B05B 15/00
[52] U.S. Cl. ...................................... 248/87; 248/55; 248/156
[58] Field of Search ................. 248/87, 88, 76, 79, 248/81, 82, 530, 545, 156, 55

[56] References Cited

U.S. PATENT DOCUMENTS

| | | | |
|---|---|---|---|
| 750,742 | 1/1904 | Weston | 248/156 X |
| 1,831,306 | 11/1931 | Kakimoto | 248/55 X |
| 2,846,189 | 8/1958 | MacLaughlin | 248/76 X |
| 2,865,673 | 12/1958 | Hathaway | 248/88 X |
| 3,445,809 | 5/1969 | McLoad | 248/156 |
| 3,488,068 | 1/1970 | De Voe | 248/88 X |
| 5,090,647 | 2/1992 | Clarke | 248/81 X |

FOREIGN PATENT DOCUMENTS 899779 6/1962 United Kingdom .................. 248/87

Primary Examiner—Karen J. Chotkowski
Attorney, Agent, or Firm—Leon Gilden

[57] ABSTRACT

A hose guide arranged for permitting reorientation and guidance of a fluid in a pneumatic hose is provided to include a central support post mounting an abutment disc at its upper end, and rotatably mounting roller guide discs below the abutment guide disc to permit orientation and alignment of hoses along the guide discs relative to and below the abutment disc.

5 Claims, 4 Drawing Sheets

HOSE GUIDE APPARATUS

BACKGROUND OF THE INVENTION

1. Field of the Invention

The field of invention relates to guide apparatus, and more particularly pertains to a new and improved hose guide apparatus wherein the same is arranged for the orientation of hoses to permit their deflection and guidance about corners and the like.

2. Description of the Prior Art

Prior art hose guide apparatus is exemplified in U.S. Pat. No. 4,404,925 to Louwsma wherein a hose guide includes a wedge-shaped member to guide a hose about the wedge in use.

U.S. Pat. No. 3,522,815 to Prange sets forth a conduit member to provide for guidance of a hose therethrough.

U.S. Pat. No. 3,650,545 to Freed sets forth a hose guide utilizing a guide loop for permitting displacement of hoses between a truck and trailer organization.

U.S. Pat. No. 4,836,432 to Violette sets forth a hose guide of a generally "U" shaped configuration permitting guidance of hoses thereabout.

As such, it may be appreciated that there continues to be a need for a new and improved hose guide apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of hose guide apparatus now present in the prior art, the present invention provides a hose guide apparatus wherein the same is arranged to provide for the direction and orientation of hose members about a roller guide surface. As such, the general purpose of the present invention, which will be described subsequently in greater detail, is to provide a new and improved hose guide apparatus which has all the advantages of the prior art hose guide apparatus and none of the disadvantages.

To attain this, the present invention provides a hose guide arranged for permitting reorientation and guidance of a fluid in a pneumatic hose provided to include a central support post mounting an abutment disc at its upper end, and rotatably mounting roller guide discs below the abutment guide disc to permit orientation and alignment of hoses along the guide discs relative to and below the abutment disc.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hose guide apparatus which has all the advantages of the prior art hose guide apparatus and none of the disadvantages.

It is another object of the present invention to provide a new and improved hose guide apparatus which may be easily and efficiently manufactured and marketed.

It is a further object of the present invention to provide a new and improved hose guide apparatus which is of a durable and reliable construction.

An even further object of the present invention is to provide a new and improved hose guide apparatus which is susceptible of a low cost of manufacture with regard to both materials and labor, and which accordingly is then susceptible of low prices of sale to the consuming public, thereby making such hose guide apparatus economically available to the buying public.

Still yet another object of the present invention is to provide a new and improved hose guide apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
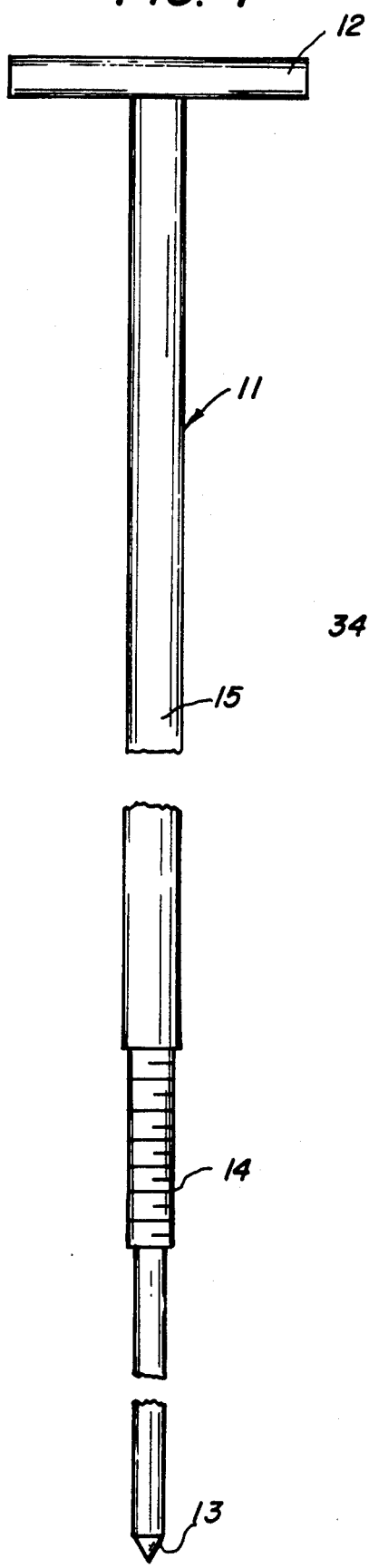
FIG. 1 is an orthographic side view of the guide post of the invention.
Figure 2:
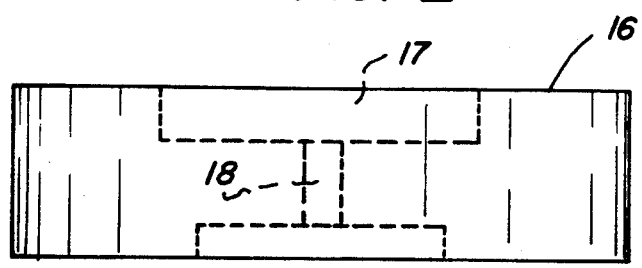
FIG. 2 is an orthographic side view of the abutment disc utilized by the invention.
Figure 3:
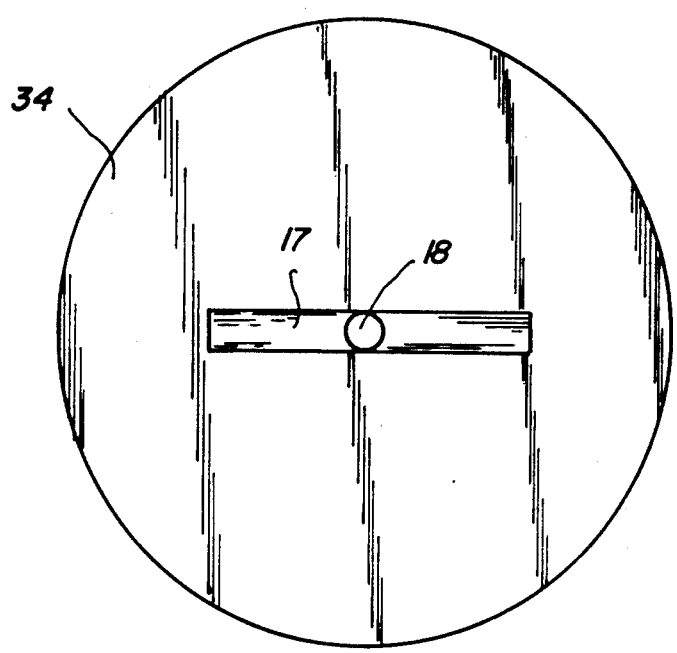
FIG. 3 is an orthographic top view of the abutment disc.
Figure 4:
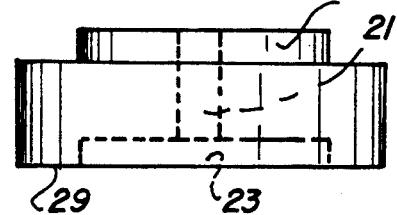
FIG. 4 is an orthographic side view of a guide disc utilized by the invention.
Figure 5:
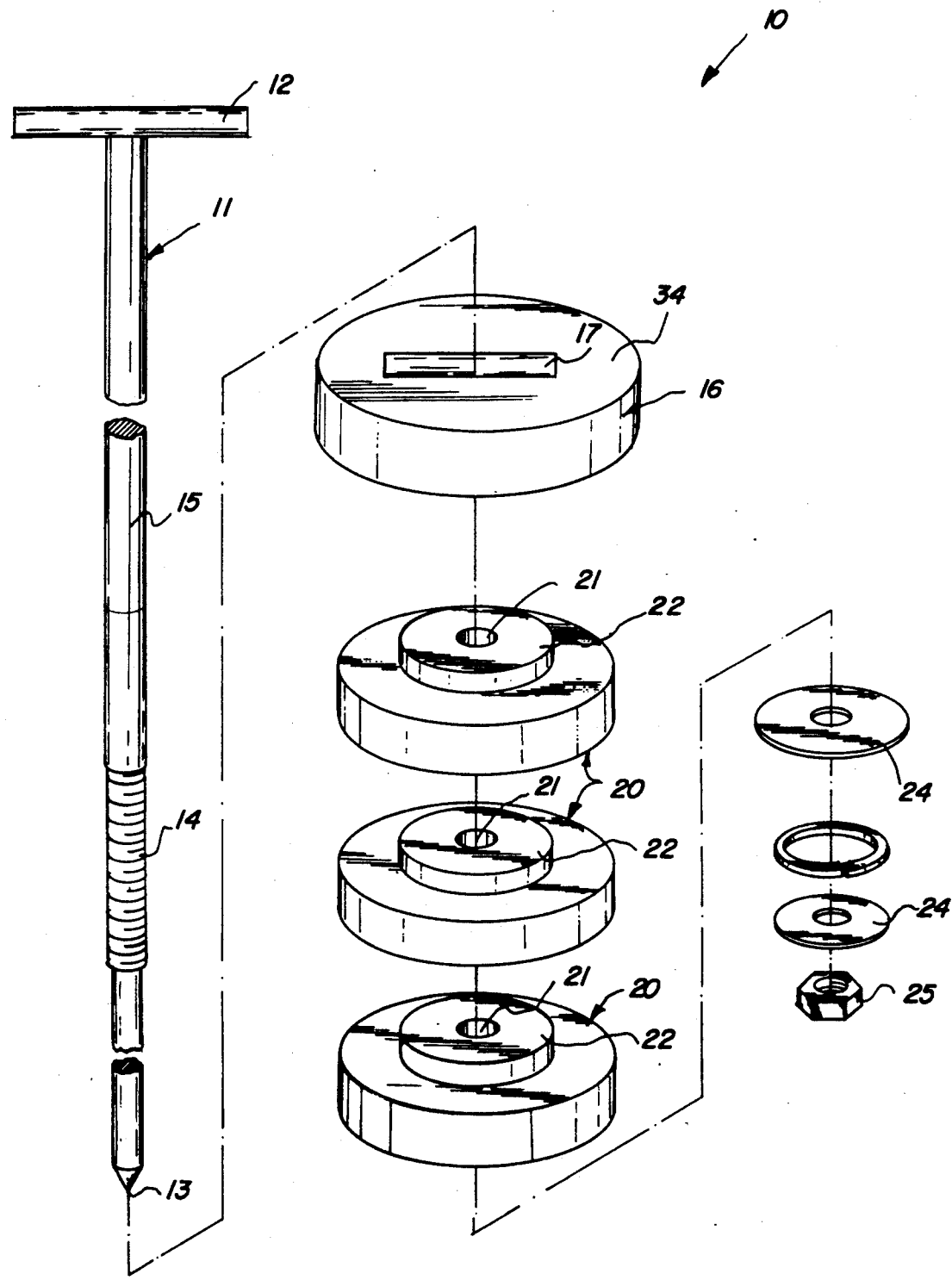
FIG. 5 is an isometric illustration of the instant invention.

With reference now to the drawings, and in particular to FIGS. 1 to 9 thereof, a new and improved hose guide apparatus embodying the principles and concepts of the present invention and generally designated by the reference numerals 10 and 10a will be described.

More specifically, the hose guide apparatus 10 of the instant invention illustrates the use of a support post 11 formed with an integrally mounted abutment bar 12 secured at an upper distal end of the support post, with a lower distal end of the support post terminating in a lower pointed end 13. A shank portion 14 is spaced above the lower pointed end to provide for support of a support post when driven into an underlying ground surface (not shown), with a smooth bearing surface 15 spaced between the threaded shank portion 14 and the abutment bar 12.

A disc 16 is provided formed with a disc top wall 34 spaced from and parallel a disc bottom wall 35. The disc top wall 34 includes a groove 17 directed diametrically thereof to receive the abutment bar 12 complementarily therewithin. The coaxially aligned abutment disc bore 18 directed through the abutment disc receives the bearing surface 15 therethrough wherein the bottom wall 35 is formed with a cylindrical recess 19 at a bottom surface thereof. The abutment disc 16 is defined by a first diameter, and wherein the cylindrical recess 19 receives the cylindrical guide projection 22 of a third diameter formed coaxially to a top surface of a roller guide disc 22 defined by a second diameter. The second diameter is less than the first diameter, and wherein the third diameter is less than second diameter as the cylindrical guide projection 22 is complementarily received within the cylindrical recess 19, and wherein the roller guide discs 20 each include a disc central coaxial bore 21 to also receive the bearing surface 15 therethrough. Fastener plates 24, as well as a fastener nut member 25, are secured to the threaded shank portion 14 as the bearing surface 15 is defined by a predetermined length and wherein the guide discs 20 and the abutment disc 16 define a cumulative axial length substantially equal to the predetermined length.

Figure 6:
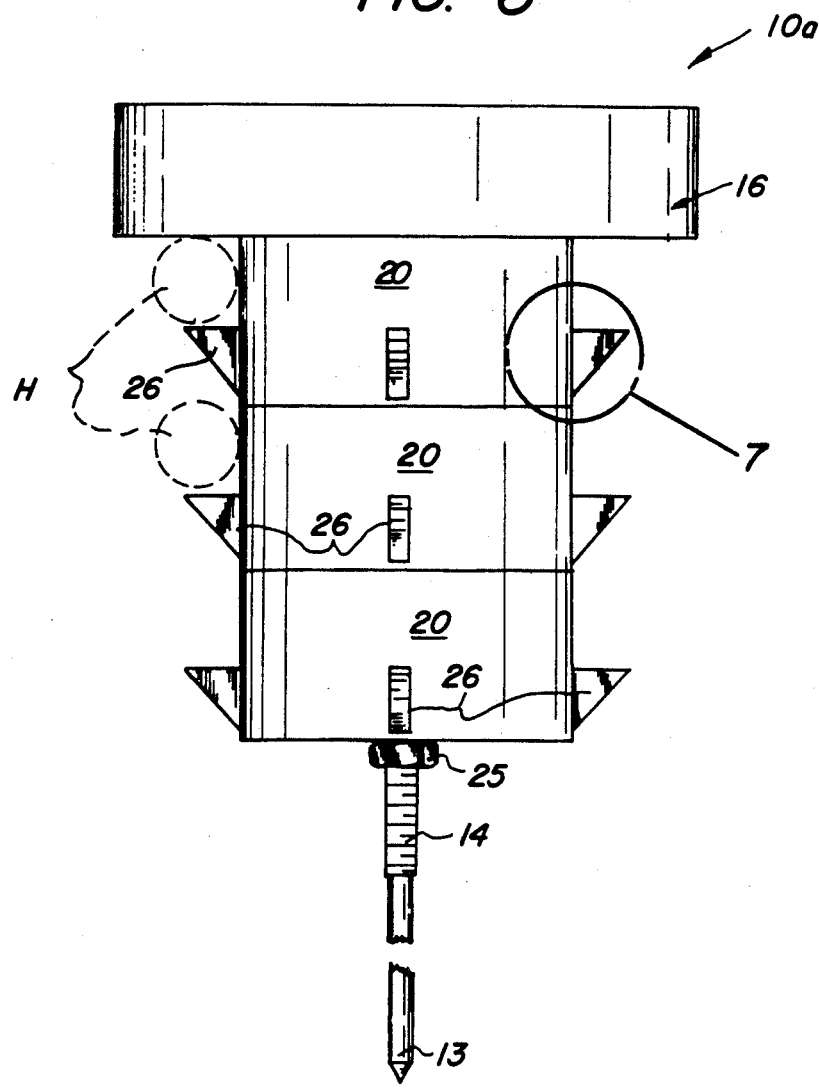
FIG. 6 is an orthographic side view of the invention in an assembled configuration.
Figure 7:
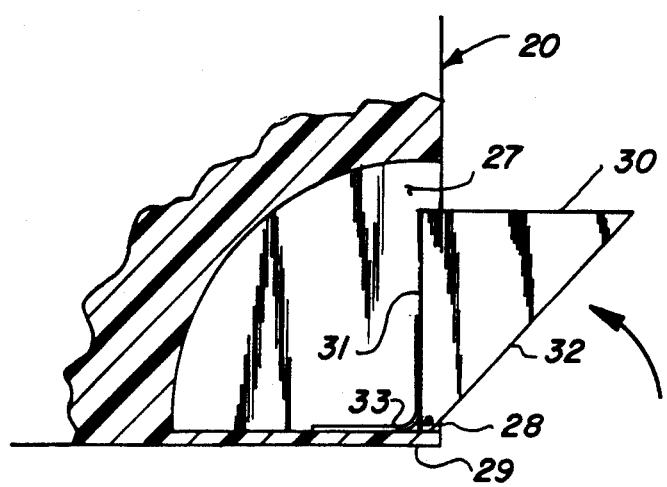
FIG. 7 is an orthographic partial sectional view of a modified use of the abutment plate structure of the invention.

The apparatus 10a, as illustrated in FIG. 6 for example, includes each roller guide disc 20 formed with a generally right triangular abutment plate 26 pivotally mounted radially relative to each guide disc 20 complementarily received within an abutment plate cavity 27 and in communication with an interior surface of each guide disc. Each abutment plate 26 is pivotally mounted about a pivot axle 28 adjacent the guide disc floor 29. In the first extended orientation of each abutment plate, the abutment plate includes a plate top edge 30 oriented orthogonally relative to the axis of the guide disc 20 and an interior edge 31 oriented parallel relative to the axis of the guide disc 20. The hypotenuse 32 is canted downwardly and rearwardly relative to a forward edge of the top edge 30 towards a lower tend of the interior edge 31 adjacent the pivot axle 28. A biasing spring 33 mounted to the disc floor 29 and to the interior edge 31 biases each abutment plate 26 to the first position permitting pivotment interiorly of the abutment plate cavity 27 in a second position, wherein a hose "H" (see FIG. 6 for example) is thereby captured between the abutment disc and an overlying disc permitting the use of a plurality of hoses in a non-binding orientation about the same structure.

Figure 8:
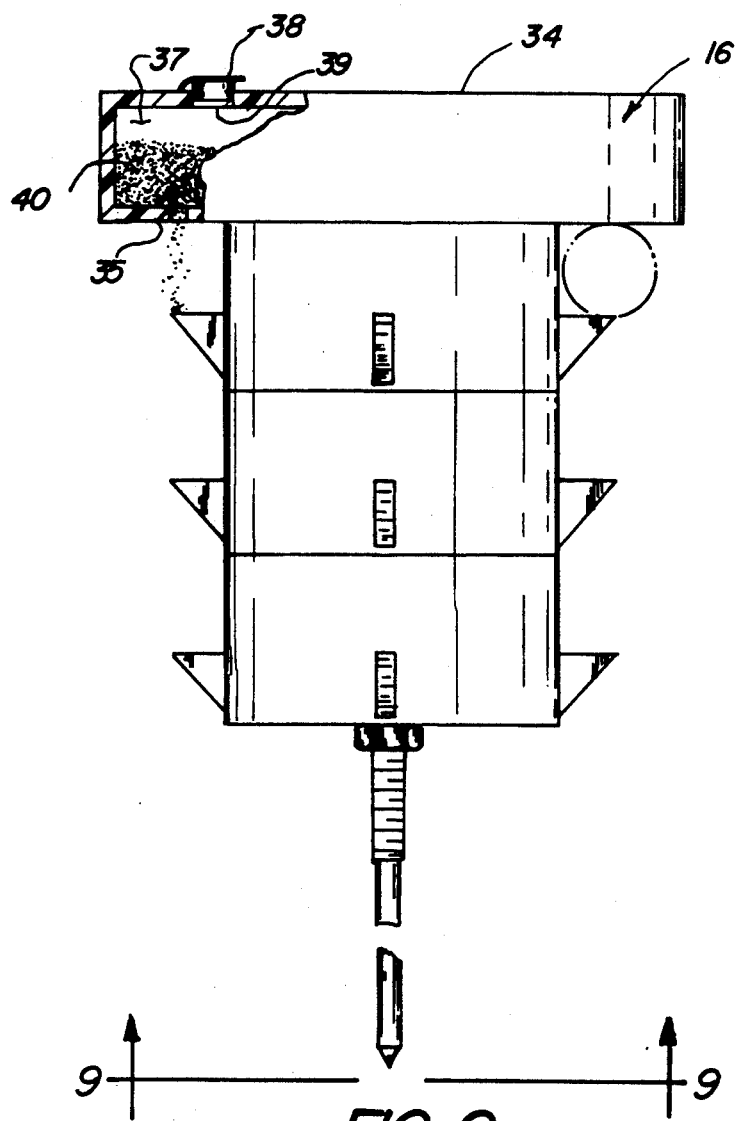
FIG. 8 is an orthographic side view, partially in section, of a further modified aspect of the invention.
Figure 9:
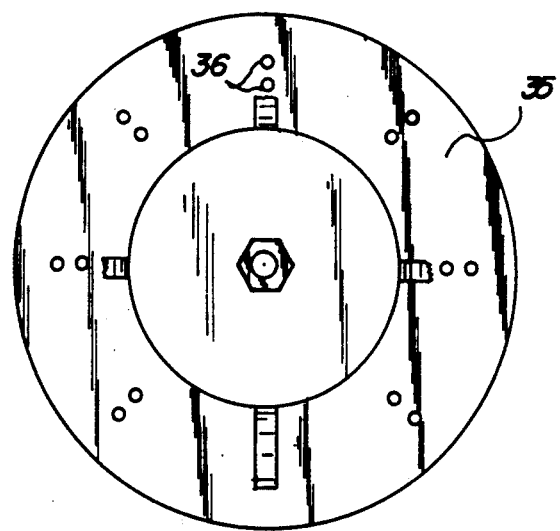
FIG. 9 is an orthographic view, taken along the lines 9—9 of FIG. 8 in the direction indicated by the arrows.

The abutment disc 16 is modified and illustrated in the FIGS. 8 and 9 for example and includes a matrix of openings 36 directed through the abutment disc bottom wall 35, wherein the openings 36 are positioned above the top edge 30 not to extend beyond the top edge 30 in communication with a reservoir cavity 37 within the abutment disc. A fill plug 38 directed through the abutment disc top wall 34 in communication with a fill plug bore 39 permits the refilling of the reservoir cavity 37 with a powdered graphite 40 that is thereby distributed upon the underlying hoses "H" upon impact of the hoses "H" relative to the abutment disc to jar the abutment disc sprinkling the graphite power thereon permitting ease or rotation of the hoses relative to the guide discs 20.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hose guide apparatus, comprising,
    a support post, the support post including an abutment bar fixedly and orthogonally mounted to an upper distal end of the support post, a lower distal end of the support post terminating in a lower pointed end, and
    a threaded shank portion formed about the abutment bar spaced from the lower pointed end, and
    a smooth cylindrical bearing surface extending coextensively between the threaded shank portion and the abutment bar, and
    an abutment disc mounted to the bearing surface receiving the abutment bar therewithin, and
    a plurality of roller guide discs mounted between the abutment disc and the threaded shank portion, and
    the roller guide discs and the abutment disc are arranged coextensively along the bearing surfaces, and
    the abutment disc includes an abutment disc top surface, the abutment disc top surface includes a groove formed diametrically therewithin, and the groove receives the abutment bar in a complementary relationship.

2. An apparatus as set forth in claim 1 wherein the abutment disc includes an abutment disc bottom wall, and the abutment disc bottom wall includes a cylindrical recess, and each guide disc includes a cylindrical guide projection extending upwardly of each guide disc, and wherein each guide projection is defined by a third diameter, the cylindrical recess is defined by a diameter equal to the third diameter, each roller disc is defined by a second diameter greater than the third diameter, and the abutment disc is defined by a first diameter greater than the second diameter.

3. An apparatus as set forth in claim 2 including fastening means mounted to the threaded shank portion below the guide discs for securing the guide discs between the fastening means and the abutment bar.

4. An apparatus as set forth in claim 3 wherein each guide disc includes a plurality of triangular abutment plates pivotally mounted to each guide disc, wherein the abutment plates project radially and exteriorly of each guide disc, and each abutment plate is received within an abutment plate cavity, the abutment plate cavity formed within the guide disc of the cavity projecting from an exterior surface of the guide disc interiorly thereof, and each guide disc includes a guide disc floor, and a pivot axle pivotally mounting each abutment plate relative to each cavity, wherein the pivot axle is positioned adjacent the guide disc floor, and each abutment plate includes an abutment plate top edge, an abutment plate interior edge, and an abutment plate hypotenuse, the abutment plate hypotenuse extends from an outer end portion of the top edge cantedly downwardly therefrom towards the pivot axle, and a biasing spring mounted within each cavity secured to the guide disc floor and to the abutment plate to bias the abutment plate exteriorly of the cavity.

5. An apparatus as set forth in claim 4 wherein the abutment disc includes a plurality of apertures directed through the abutment disc floor, and wherein the apertures are positioned above the abutment plates and extend radially relative to the abutment disc a predetermined length, and wherein the abutment plate top edge extends exteriorly of each abutment disc a predetermined distance, wherein the predetermined length is equal to or less than the predetermined length, and the abutment disc includes a reservoir cavity, and wherein the apertures are in communication with the reservoir cavity, the reservoir cavity including a powder graphite contained therewithin to direct the powder graphite onto a hose member positioned on the guide discs, and a fill plug directed through the abutment disc top wall, the fill plug in communication with a fill plug bore to permit replenishment of the graphite within the reservoir cavity.

* * * * *